(12) United States Patent
Hsu

(10) Patent No.: US 8,369,908 B2
(45) Date of Patent: Feb. 5, 2013

(54) PORTABLE ELECTRONIC DEVICE WITH MOVABLE KEYPAD

(75) Inventor: Ta-Chun Hsu, Tu-Cheng (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 531 days.

(21) Appl. No.: 12/430,977

(22) Filed: Apr. 28, 2009

(65) Prior Publication Data

US 2009/0298558 A1   Dec. 3, 2009

(30) Foreign Application Priority Data

May 30, 2008   (CN) .......................... 2008 1 0301880

(51) Int. Cl.
*H04M 1/00* (2006.01)
*H04B 1/18* (2006.01)

(52) U.S. Cl. ............... 455/575.4; 455/575.1; 455/575.2; 455/575.3; 455/186.2

(58) Field of Classification Search ............... 455/186.2, 455/575.1–575.4; 345/168–169; 361/679.08, 361/679.11, 679.14, 679.15–679.17; 380/52; 340/407; 379/368, 433.01–433.07; 49/379–381; 16/50, 54–65

See application file for complete search history.

(56) References Cited

U.S. PATENT DOCUMENTS

| | | | | |
|---|---|---|---|---|
| 6,073,027 | A * | 6/2000 | Norman et al. | 455/575.4 |
| 6,160,717 | A * | 12/2000 | Desousa et al. | 361/798 |
| 2002/0042853 | A1* | 4/2002 | Santoh et al. | 710/8 |
| 2004/0142719 | A1* | 7/2004 | Jung | 455/550.1 |
| 2007/0021160 | A1* | 1/2007 | Li | 455/575.4 |
| 2007/0026888 | A1* | 2/2007 | Zhou | 455/550.1 |
| 2009/0147485 | A1* | 6/2009 | Higashigawa et al. | 361/727 |

FOREIGN PATENT DOCUMENTS

| | | |
|---|---|---|
| CN | 2822047 Y | 9/2006 |
| CN | 2870322 Y | 2/2007 |

* cited by examiner

*Primary Examiner* — Nimesh Patel
*Assistant Examiner* — Thai Vu
(74) *Attorney, Agent, or Firm* — Altis Law Group, Inc.

(57) ABSTRACT

A portable electronic device includes a main body, a fixed keypad, a driving module and a movable keypad. The main body defines a cavity inside and an opening in a sidewall thereof. The fixed keypad is mounted on the main body. The movable keypad stays in the cavity until being driven to move away from the main body through the opening when a button is pressed.

6 Claims, 6 Drawing Sheets

PORTABLE ELECTRONIC DEVICE WITH MOVABLE KEYPAD

BACKGROUND

1. Technical Field

The present invention relates to portable electronic device, particularly, to a portable electronic device having a movable keypad.

2. Description of Related Art

With the development of wireless communication and information processing technologies, portable electronic devices, such as mobile telephones and personal digital assistants (PDAs), are now in widespread use. These portable electronic devices enable consumers to enjoy high technology services, anytime and anywhere. A keypad assembly as an input terminal is highly desirable.

A conventional portable electronic device generally only has a fixed keypad. However, considering the compact size of the fixed keypad, the number of keys of the fixed keypad is limited and the fixed keypad has two or more input modes (e.g., number input mode and letter input mode). Thus, users need to continually switch input modes during use (e.g., writing a message). This is inconvenient.

Therefore, there is space for improvement within the art.

BRIEF DESCRIPTION OF THE DRAWINGS

Many aspects of the portable electronic device can be better understood with reference to the following drawings. The components in the drawings are not necessarily drawn to scale, the emphasis instead being placed upon clearly illustrating the principles of the present portable electronic device, in which.

DETAILED DESCRIPTION OF THE EMBODIMENTS

Figure 1:
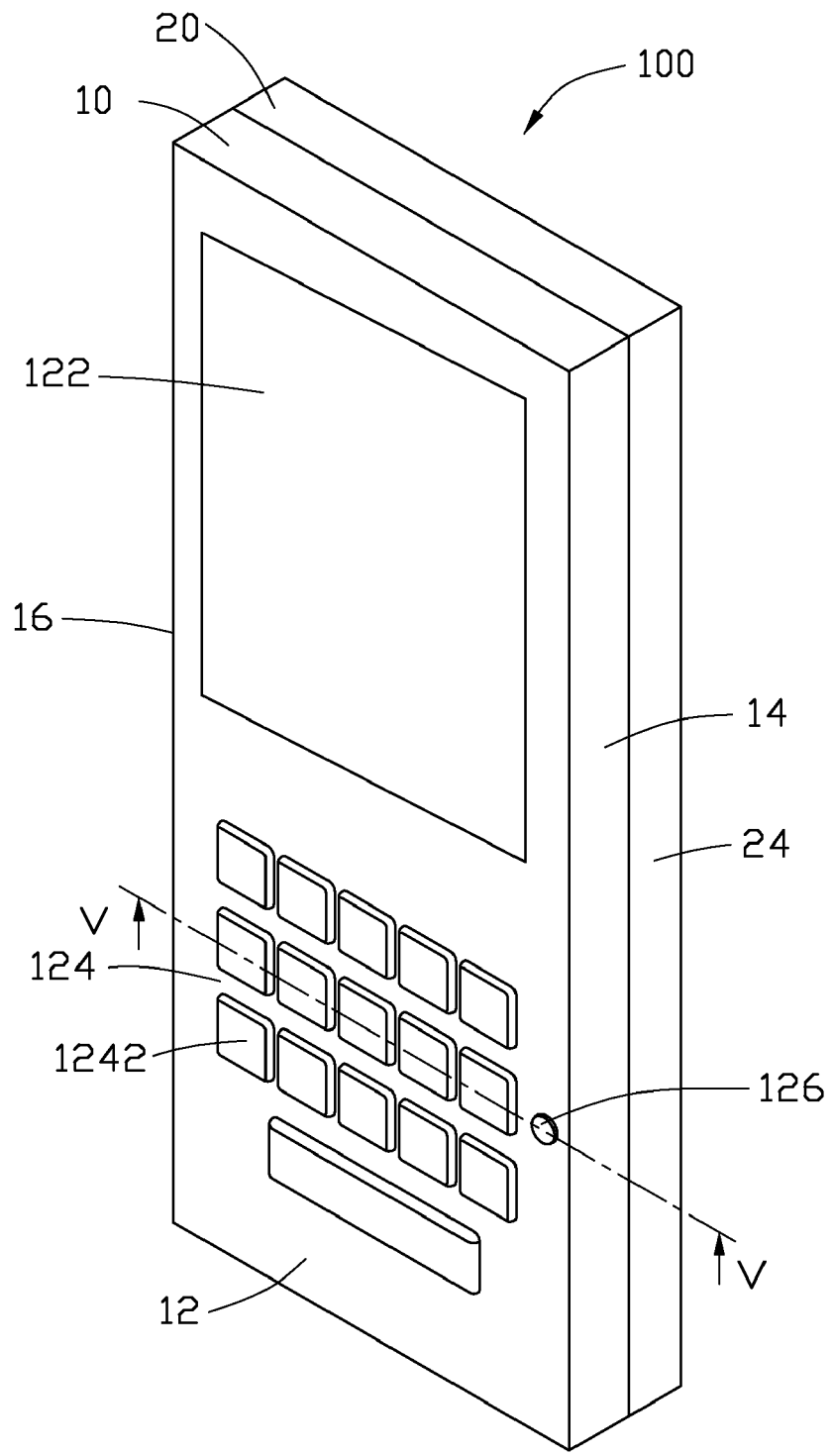
FIG. 1 is an assembled, schematic view of a portable electronic device, in accordance with an exemplary embodiment.
Figure 2:
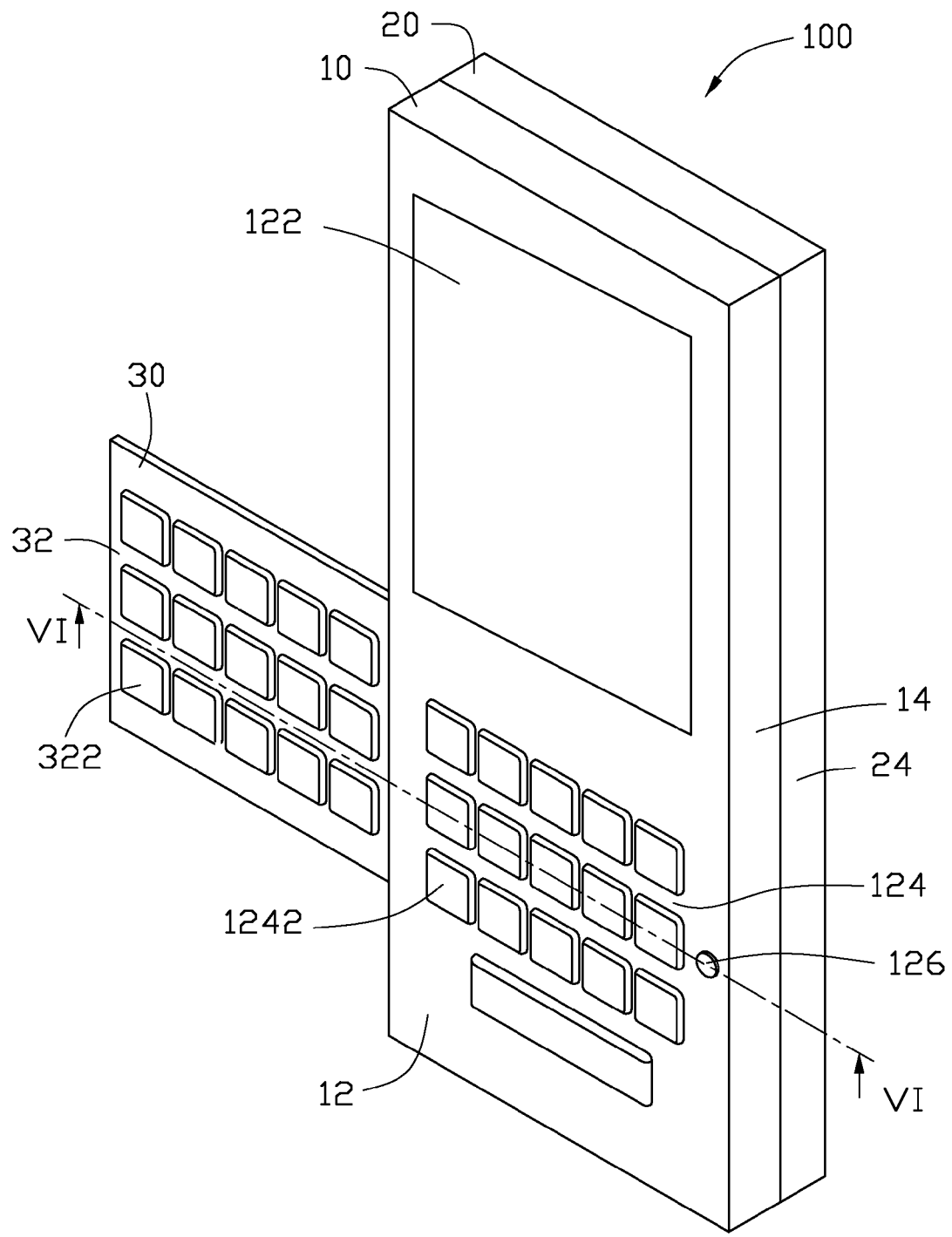
FIG. 2 is an assembled, schematic view of the portable electronic device shown in FIG. 1, showing a movable keypad of the portable electronic device.

Referring to FIGS. 1-2, a portable electronic device 100 includes a first cover 10, a second cover 20, a fixed keypad 124 fixed to the first cover 10, a movable keypad 30 positioned between the first cover 10 and the second cover 20, and a driving module 40 (FIG. 5), in accordance with an exemplary embodiment.

The first cover 10 includes a main board 12, a first sidewall 14 and a second sidewall 16. The first sidewall 14 and the second sidewall 16 are vertically formed at opposite sides of the main board 12. A display 122 is set on the main board. The fixed keypad 124, adjacent to the display, has a plurality of first keys 1242 mounted on the main board. A button 126, positioned at one side of the fixed keypad 124, is configured for releasing the movable keypad 30.

Figure 3:
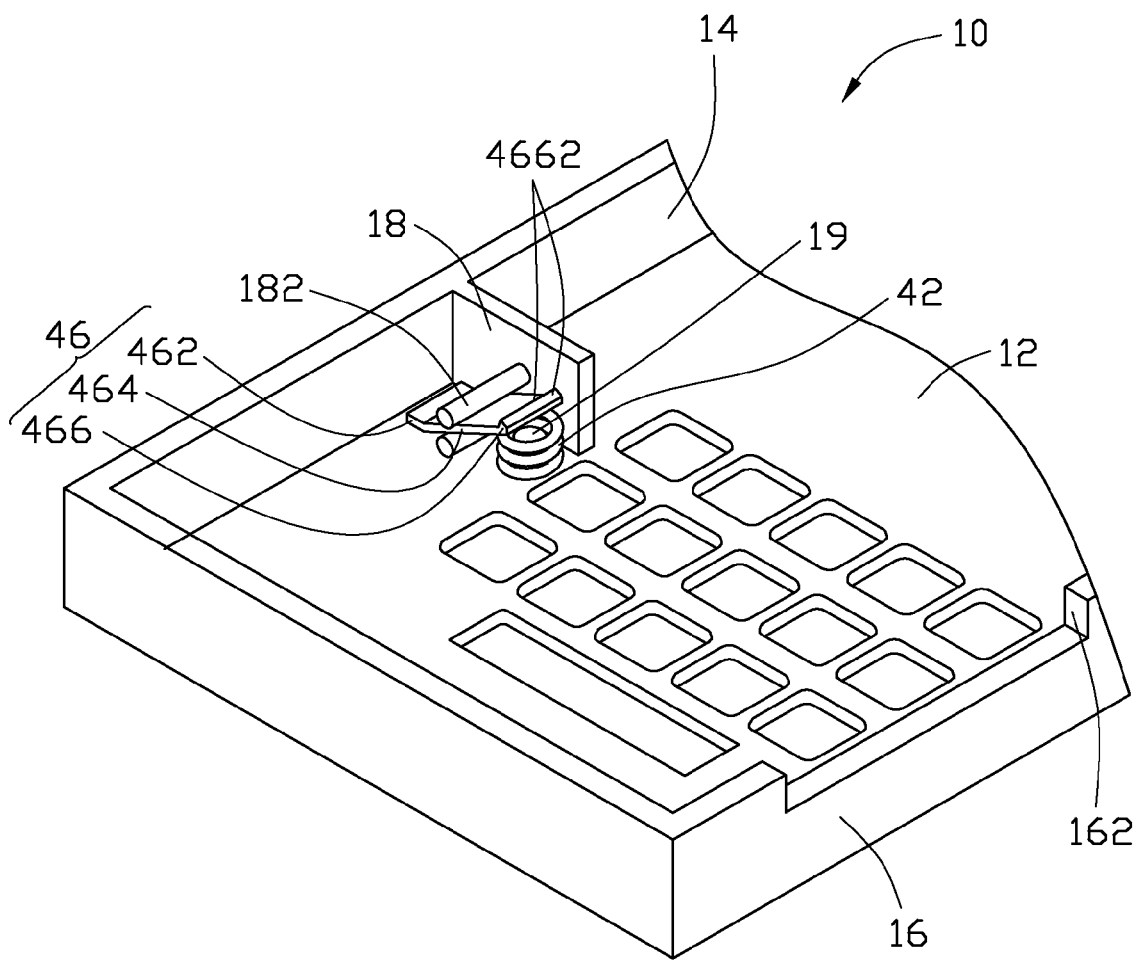
FIG. 3 is a partially, schematic view of a first cover of the portable electronic device shown in FIG. 1.

Referring to FIG. 3, a transverse board 18 extends from an inner surface of the main board 12, vertically connecting with the first sidewall 14. A column 19 is formed on the inner surface of the main board 12, being adjacent to the transverse board 18. Two parallel pivots 182 vertically extend from the transverse board 18, and has a space therebetween. The two pivots 182 and the column 19 are positioned at a same side of the transverse board 18. The second sidewall 16 defines a first cutout 162 configured for allowing the movable keypad 30 to pass.

Figure 4:
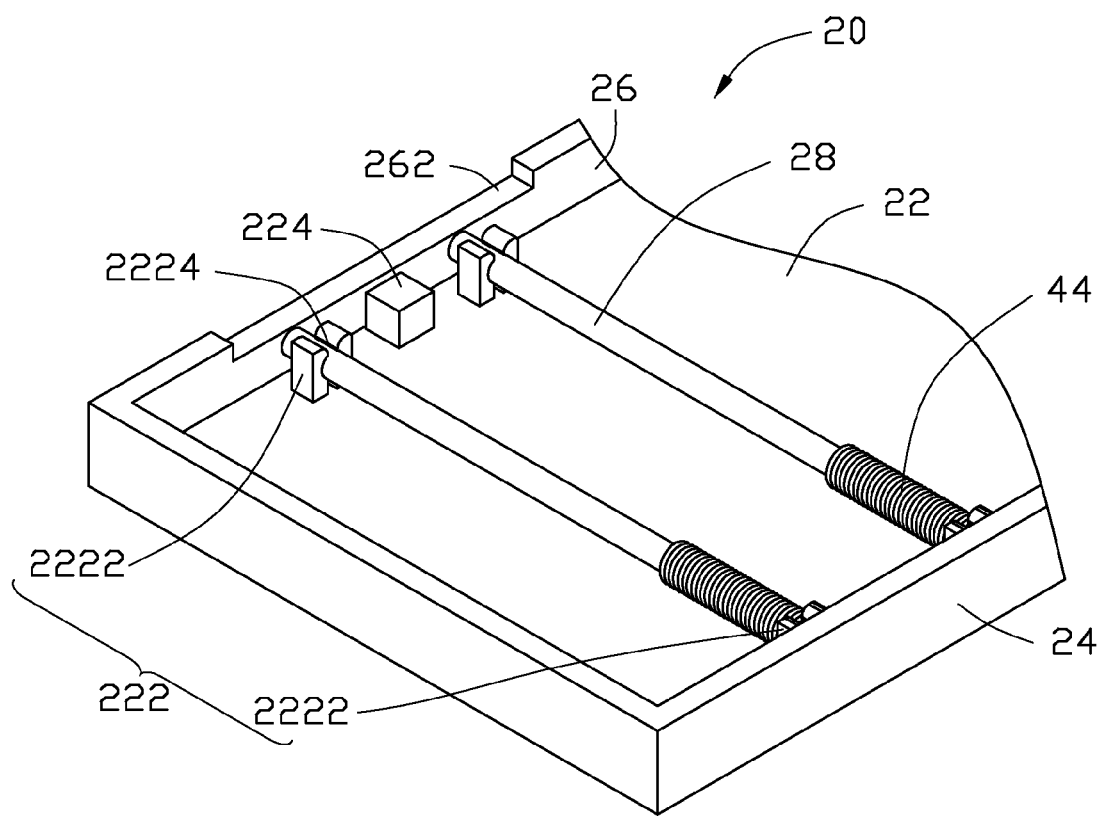
FIG. 4 is a partially, schematic view of a second cover of the portable electronic device shown in FIG. 1.

Referring to FIG. 4, the second cover 20 includes a bottom board 22, a third sidewall 24 and a fourth sidewall 26. The third sidewall 24 and the fourth sidewall 26 are positioned at opposite sides of the bottom board 22. Two supporting modules 222 and a first electronic connecting port 224 are set on the bottom board 22. The supporting modules 222 are parallel to each other. Each supporting module 222 has two blocks 2222 positioned at opposite side of the bottom board 22, respectively adjacent to the third sidewall 24 and the fourth sidewall. Each block 2222 defines a recess 2224 at a top surface, wherein the recess 2224 has a semicircular cross-section. Two guide posts 28 are respectively set on the supporting modules 222, with two ends secured in the recess 2224 of the blocks 2222. The first electronic connecting port 224 is positioned adjacent to the fourth sidewall 26 and between the blocks 2222. The first electronic connecting port 224 electronically connects with a main printed circuit board (not shown) of the electronic device and a first key flexible circuit board (not shown), so that the user can operate the portable electronic device using the keys of the fixed keypad 124. The fourth sidewall 26 defines a second cutout 262 corresponding to the first cutout 162 of the second sidewall 16 of the first cover 10.

Figure 5:
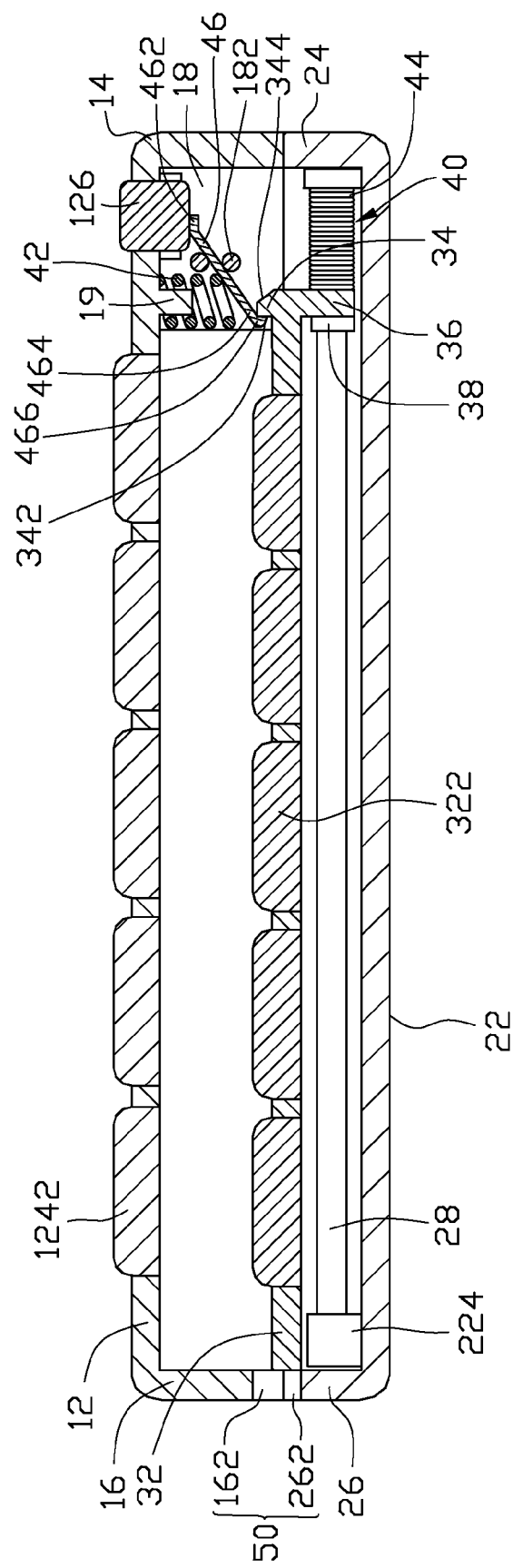
FIG. 5 is a cross-sectional view taken along line V-V of FIG. 1, showing the movable keypad shown in FIG. 2 inside the portable electronic device.
Figure 6:
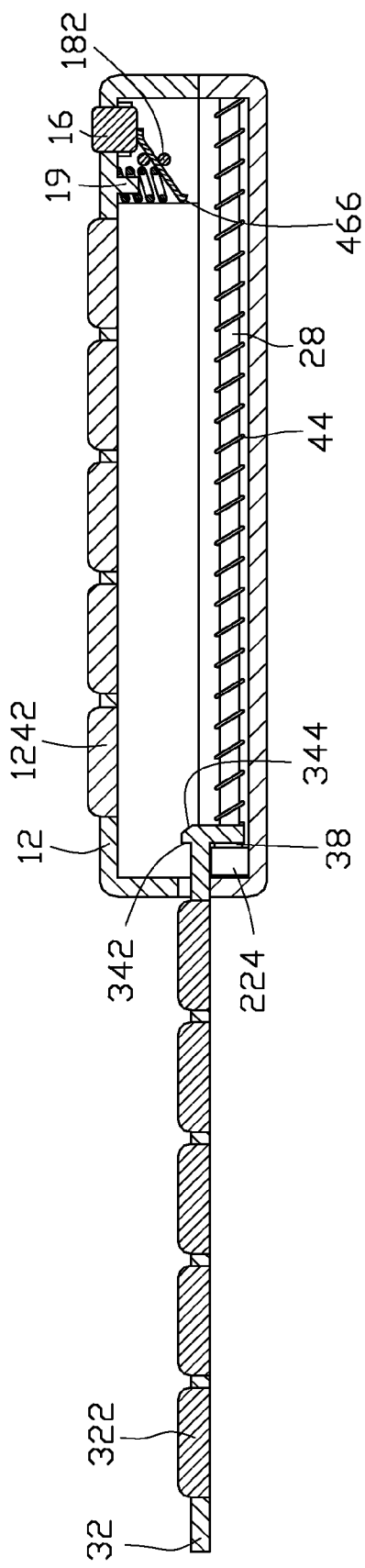
FIG. 6 is a cross-sectional view taken along line VI-VI of FIG. 2.

Referring to FIG. 5, the movable keypad 30 includes a base 32 and a plurality of second keys 322. The base 32 has a protrusion 34 and a guide portion 36 at one end thereof. The protrusion 34 and the guide portion 36 are positioned at opposite sides of the base 32. The protrusion 34 has a vertical surface 342 facing the second keys 322 and a slope 344 being opposite to the vertical surface 342. The guide portion 36 defines two guide slots (not shown) at one end thereof. The guide slots are configured for matching the guide posts 28, so that the movable keypad 30 can slide along the guide posts 28. A second electronic connecting port 38 is attached to the guide portion 36, connecting with a second key flexible circuit board (not shown).

The driving module 40 includes a first spring 42, two second springs 44 and a swing board 46. The two second springs 44 are respectively mounted on the guide posts 28. The swing board 46 has a main body 464, a resisting end 462 for resisting the button 126 and a latching end 466 for latching the protrusion 34 of the movable keypad 30.

In assembly, the main body 464 of the swing board 46 is positioned between the two pivots 182 of the first cover 10, so that the swing board 46 can swing relative to the pivots 182. One end of the first spring 42 is secured on the column 19 of the first cover 10, and another end resists the main body 464 of the swing board 46. Since the first spring 42 always resists the swing board 46 at one side of the pivots 182, the resisting end 462 of the swing board 46 is raised up and resists the button 126. The second springs 44 mounted on the guide posts 28 are positioned away from the second cutout 262. The movable keypad 30 is set on the second cover 20, with the guide slots thereof respectively matching the guide posts 28. The first cover 10 is then attached to the second cover 20. The first cutout 162 and the second cutout 262 together form an opening 50, and the movable keypad 30 is disclosed through the opening 50.

When the movable keypad 30 is being pushed inside, the movable keypad 30 slides along the guide posts 28, and the second springs 44 are resisted and compressed by the guide portion 36 of the movable keypad 30. The protrusion 34 of the movable keypad 30 pushes the latching end 466 of the swing board 46, and the latching end 466 slides along the slope 344 of the protrusion 34. When the protrusion 34 is moved to another side of the latching end 466 of the swing board 46, the latching end 466 is pushed toward the base 32 by the first spring 42 and latches the protrusion 34.

In use, the button 126 is pressed to push down against the resisting end 462 of the swing board 46, and the swing board 46 rotates relative to the pivots 182. The latching end 466 of the swing board 46 is raised up, and the movable keypad 30 is pushed outward by a rebounding force of the compressed second springs 44 until the guide portion 36 reaches the third sidewall 24 of the second cover 20. The second electronic connecting port 38 set on the guide portion 36 touches the first electronic connecting port 224, so that the movable keypad 30 can be used with the fixed keypad 124.

When the movable keypad 30 is pushed inside the portable electronic device 100, the second electronic connecting port 38 is apart from the first electronic connecting port 224, and the fixed keypad 124 can be independently used.

It is to be understood that the number of the supporting modules and the guide posts 28 may be reduced to be one.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device comprising:
   a first cover including a main board, a sidewall and a transverse board perpendicularly extending from the main board and the sidewall, two parallel cylindrical pivots, each cylindrical pivot having an outer surface, and each cylindrical pivot extending from the transverse board and being parallel to the main board, the pivots defining a space therebetween;
   a second cover, the first cover attached to the second cover, the first cover and the second cover defining a cavity and an opening, a first electronic connecting port being positioned adjacent to the opening, a button being set on the first cover;
   a fixed keypad mounted on the first cover, electronically connecting with the first electronic connecting port;
   a movable keypad received in the cavity of the first cover and the second cover, a second electronic connecting port being attached to one end of the movable keypad; and
   a driving module fixed in the cavity, the driving module including a swing board having first and second opposite planar surfaces and freely received in the space between the two pivots with the first planar surface in contact with and rolling over the outer surface of one of the pivots and the second planar surface in contact with and rolling over the outer surface of the other pivot, the swing board having a resisting end resisting the button and a latching end for latching the movable keypad, when the button is pressed to descend the resisting end, the latching end is raised and releases the moveable keypad, and the movable keypad moves out of the cavity through the opening and the movable keypad electronically connecting with the fixed keypad by the first electronic connecting port touching the second electronic connecting port
   wherein the driving module further comprises at least one second spring, at least one guide post is fixed between opposite sidewalls of the second cover, the movable keypad is attached to and slidable relative to the at least one guide post, and the at least one second spring is mounted on one end of the at least one guide post, resisting one end of the movable keypad;
   wherein the driving module further comprises a first spring, a column is formed on the first cover, one end of the first spring is fixed to the column and another end resists the swing board, and the first spring and the button are positioned at opposite sides of the pivots.

2. The portable electronic device as claimed in claim 1, wherein the movable keypad comprises a base, and the base has a protrusion at one end thereof configured for engaging with the latching end of the swing board.

3. The portable electronic device as claimed in claim 2, wherein the second cover includes at least one guide post, the movable keypad is attached to and slidable relative to the at least one guide post, the base further comprises a guide portion, and the guide portion defines at least one guide slot engaging with the guide post.

4. The portable electronic device as claimed in claim 3, wherein at least one supporting module including two blocks is formed on the lower upper, the blocks respectively define a recess for securing one end of the at least one guide post.

5. The portable electronic device as claimed in claim 4, wherein the number of the at least second spring, the at least one guide post, the at least one guide slot and the at least one supporting module are two.

6. The portable electronic device as claimed in claim 5, wherein the first electronic connecting port is positioned between the two at least one guide posts, and the second electronic connecting port is attached to the guide portion of the movable keypad.

\* \* \* \* \*